Dec. 31, 1968   A. C. MEIRESONNE   3,419,375
APPARATUS FOR SUPPORTING AND GLAZING GLASS ARTICLES
Filed May 7, 1965   Sheet 1 of 6
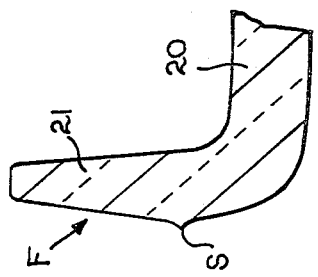
FIG. 9
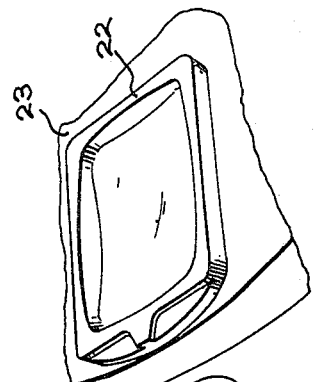
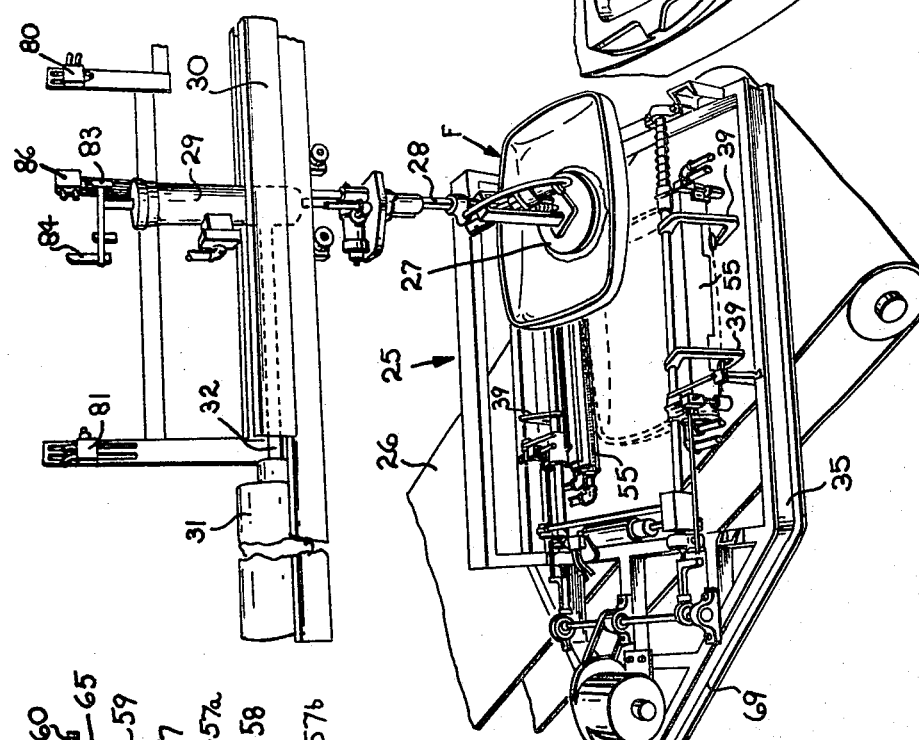
FIG. 1
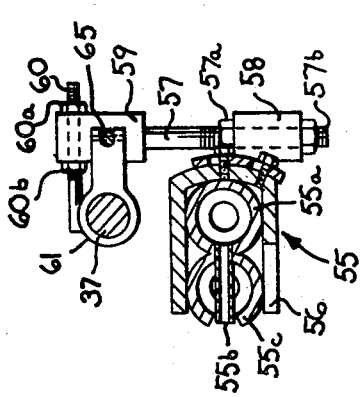
FIG. 8
INVENTOR.
ARTHUR C. MEIRESONNE
BY
ATTORNEYS

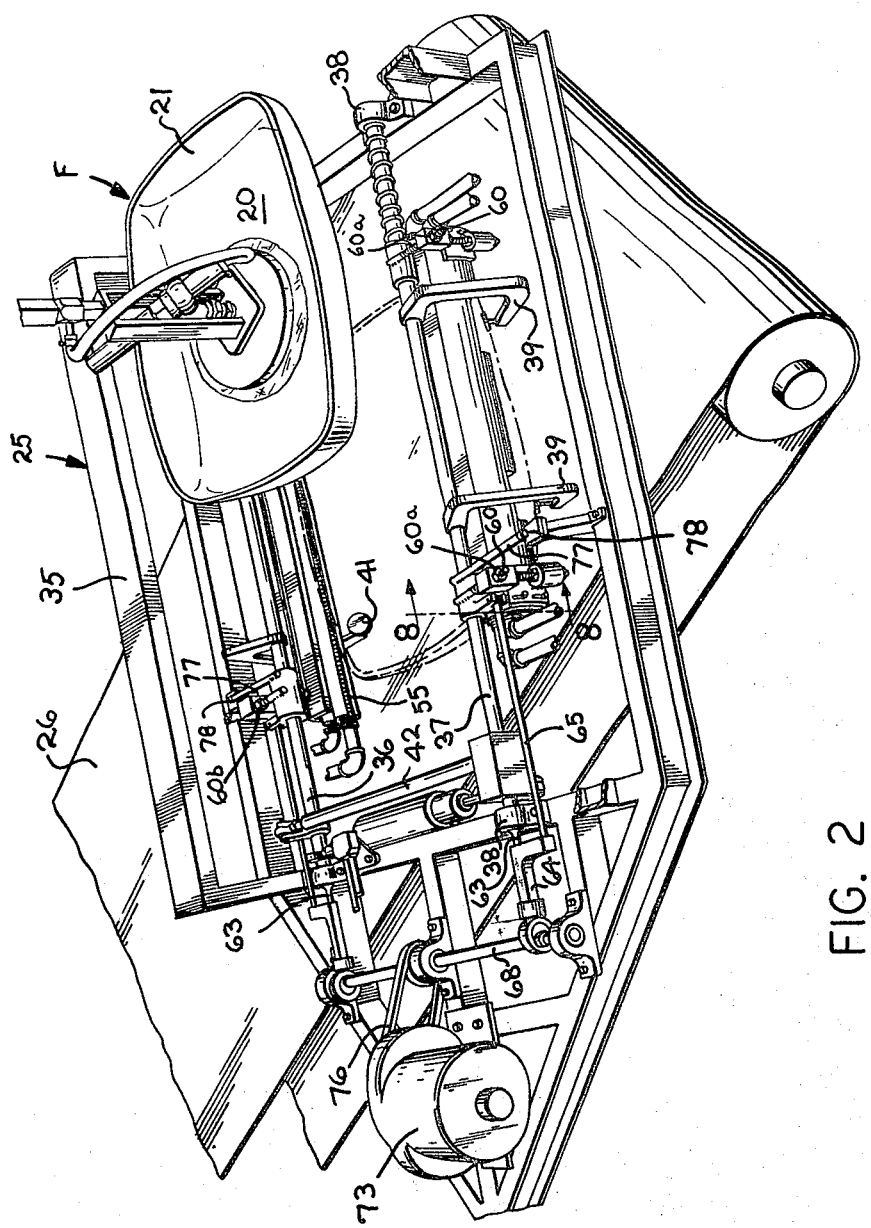

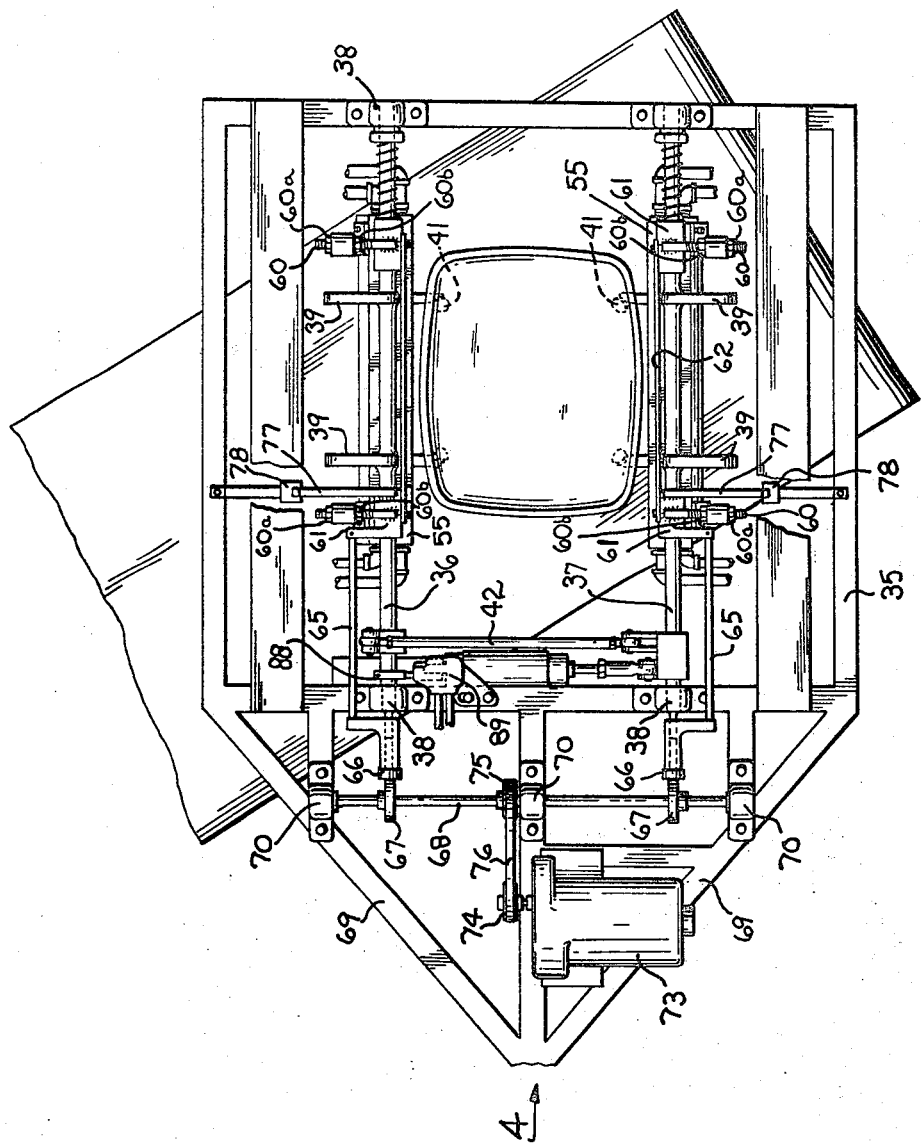

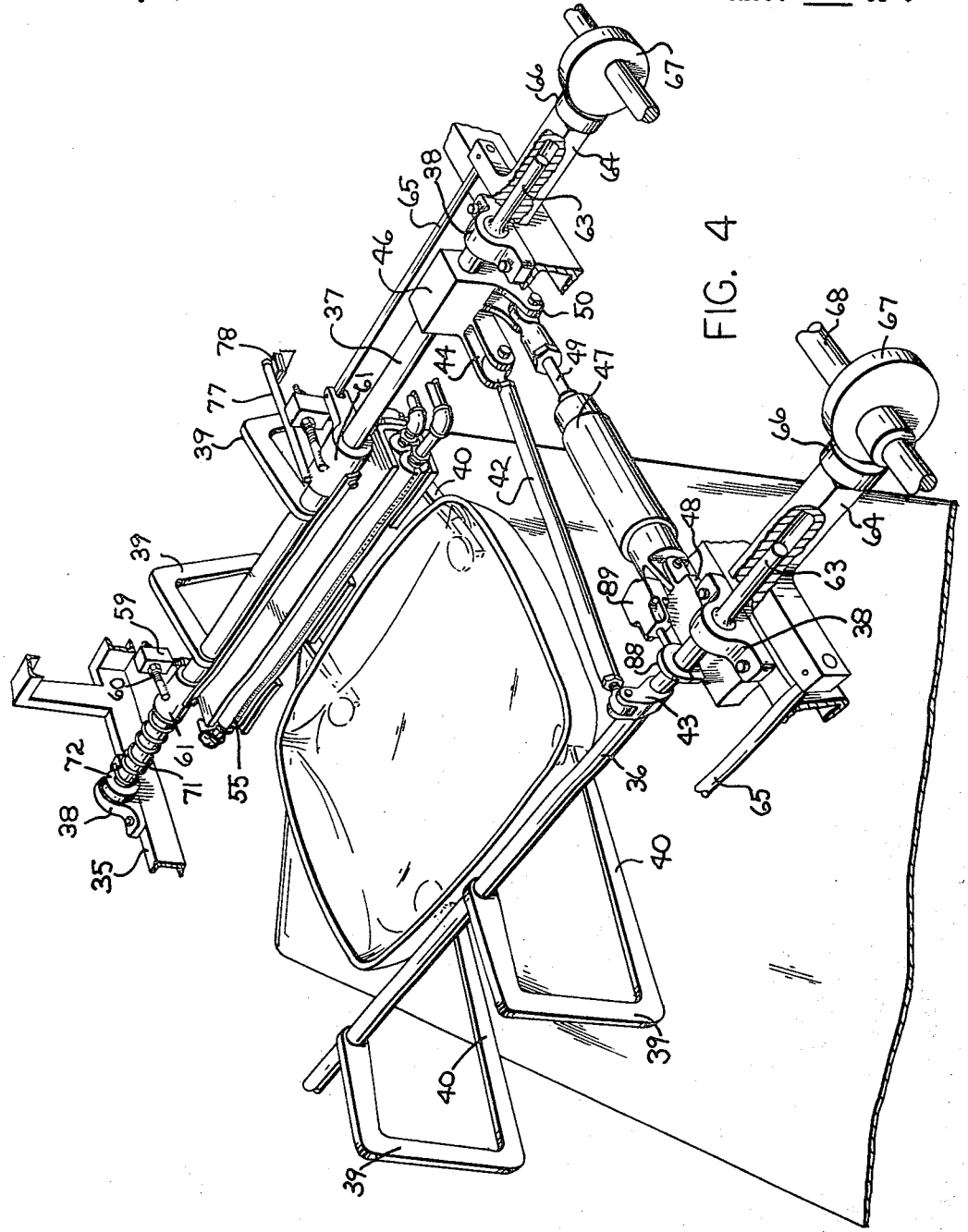

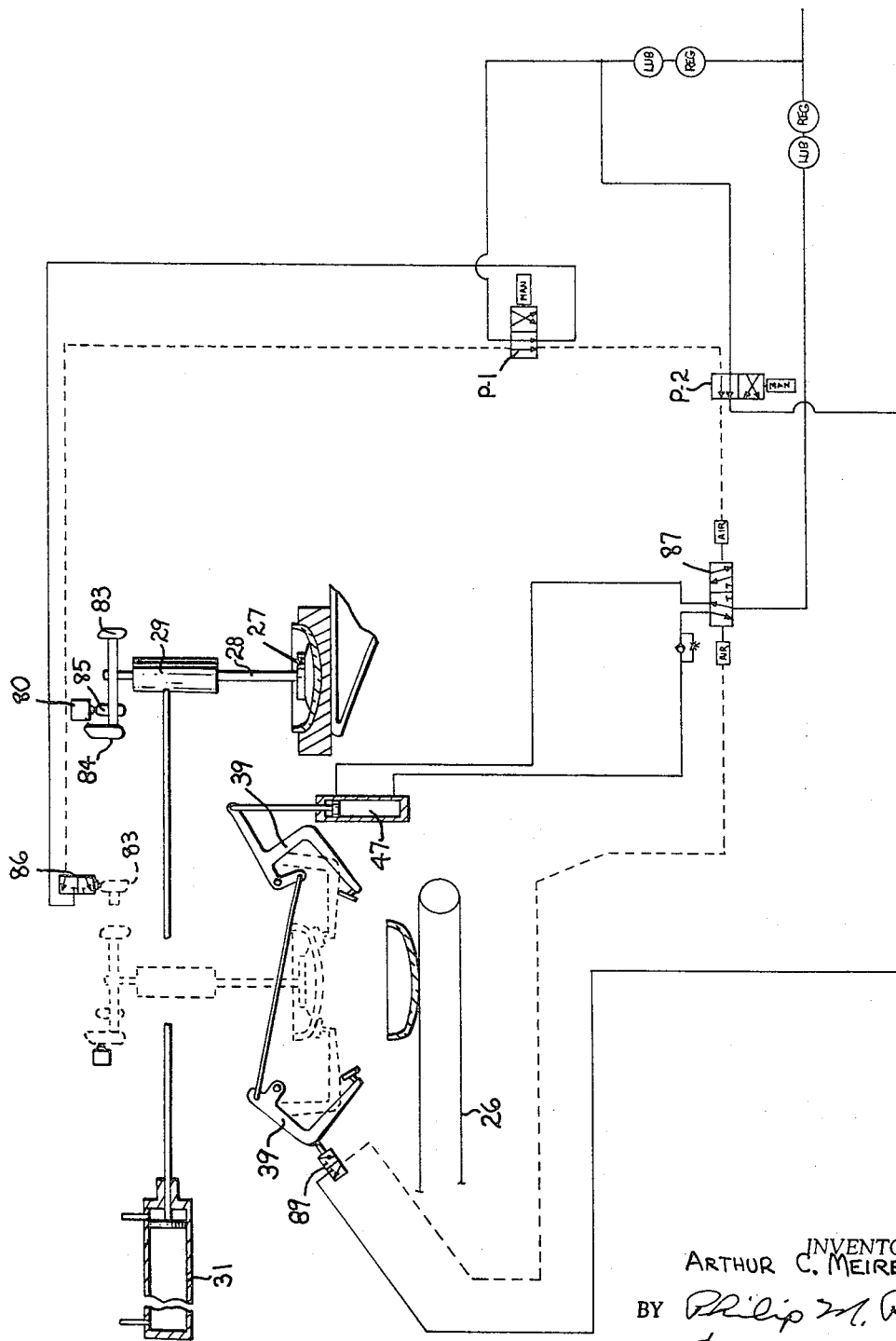

United States Patent Office

3,419,375
Patented Dec. 31, 1968

3,419,375
APPARATUS FOR SUPPORTING AND GLAZING GLASS ARTICLES
Arthur C. Meiresonne, Columbus, Ohio, assignor to Owens-Illinois, Inc., a corporation of Ohio
Filed May 7, 1965, Ser. No. 453,967
9 Claims. (Cl. 65—181)

ABSTRACT OF THE DISCLOSURE

This application discloses apparatus for flame-glazing the mold or seam line of a glass television face plate. The glazing station is located proximate to the molding station so that the face plate may be glazed while it still retains much of its latent heat. The face plate is transferred to support means at the glazing station by means of a transfer device comprising a suction head attached to a vertically reciprocable rod of a fluid cylinder, the cylinder being reciprocable in a horizontal direction between the molding and glazing stations. At the glazing station the article is glazed by spaced, opposed reciprocable line burners while the article is supported along each of an opposed pair of sides by at least a pair of arms attached to a common shaft. After the glazing cycle is completed, the support arms are rotated downwardly in unison out of their supporting position to drop the article upon the upper reach of a transfer conveyor for transfer to a subsequent processing station.

---

This invention relates to glazing portions of glass articles and particularly portions of the glass face plate which is to be made a part of a glass cathode ray tube bulb.

In the manufacture of glass articles such as a glass face plate for a cathode ray tube bulb which comprises a substantially flat viewing portion and a peripheral flange, the articles are formed with a seam or mold match line at the area of juncture of separable portions of the mold. For example, in the case of a pressing of a face plate for a cathode ray tube bulb, there may be a fine seam line in some portions of the area of juncture of the flange and flat viewing portion. In order to prevent points of incipient weakness and improve the appearance of the face plate, it is necessary to glaze such portions with heat to eliminate the seam line.

It is therefore an object of the invention to provide an apparatus for glazing glass articles efficiently and quickly with a minimum interruption in the production thereof.

It is a further object of the invention to provide such an apparatus wherein glazing of successive glass articles is performed uniformly throughout the desired portions of the glass article.

It is a further object of the invention to provide such an apparatus for glazing the face plates for cathode ray tube bulbs in such a manner that the desired glazing is achieved without distorting any portions of the bulb.

According to the invention, the article, such as the face plate, is removed from the forming machine and immediately moved to a support. Burners, which are positioned at the support, direct flames against the desired portions of the article. The article portions are quickly glazed by the combined heat of the burner flames and the latent heat in the article from the forming operation. The article is thereafter released and moved to a subsequent operation. The burners are preferably reciprocated along the seam or mold line in order to uniformly glaze the desired portions without producing hot spots, such as might occur in the event that the burner has some flame portions which produce more heat than other portions.

In the drawings:

FIG. 1 is a fragmentary perspective view of an apparatus embodying the invention.

FIG. 2 is a fragmentary perspective veiw of a portion of the apparatus embodying the invention.

FIG. 3 is a fragmentary plan view of the apparatus shown in FIG. 2.

FIG. 4 is a fragmentary perspective view of the apparatus shown in FIGS. 2 and 3 in the direction of the arrow of FIG. 3, parts being broken away.

FIG. 7 is a partly diagrammatic, schematic pneumatic diagram utilized in the apparatus.

FIG. 8 is a fragmentary sectional view taken along the line 8—8 in FIG. 2.

FIG. 9 is a sectional view through a face plate which is to be glazed by the apparatus embodying the invention.

Figure 5:
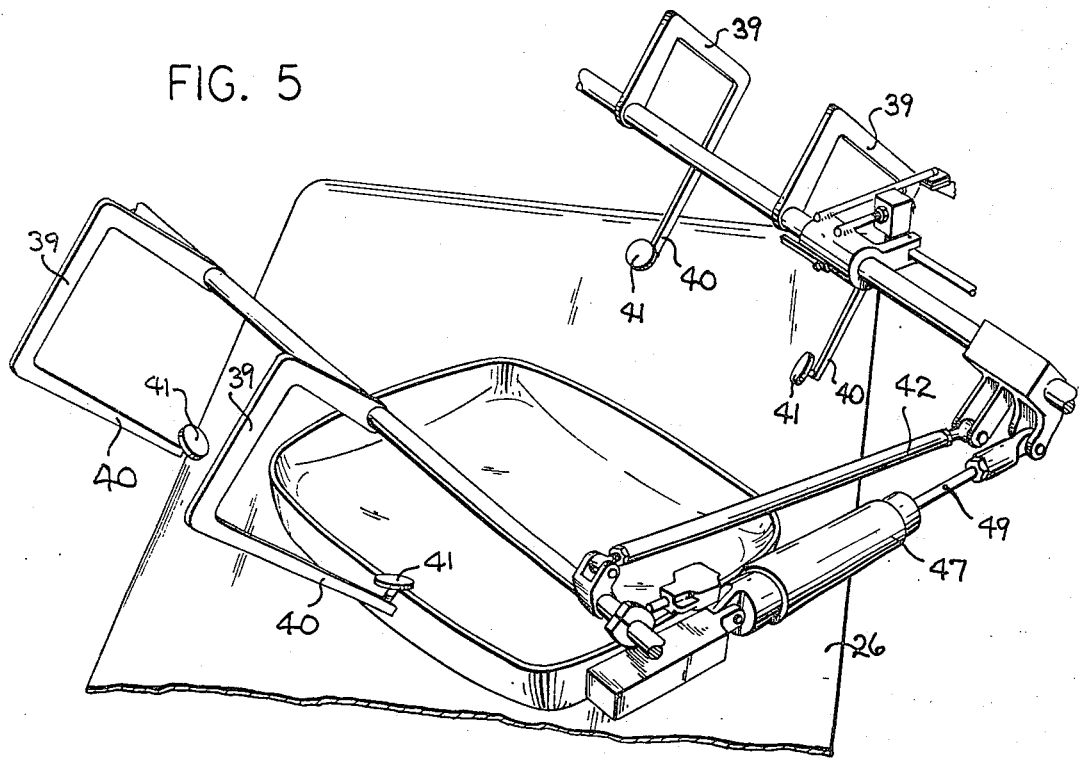
FIG. 5 is a fragmentary perspective view similar to FIG. 4, parts being broken away and parts being shown in a different operative position.
Figure 6:
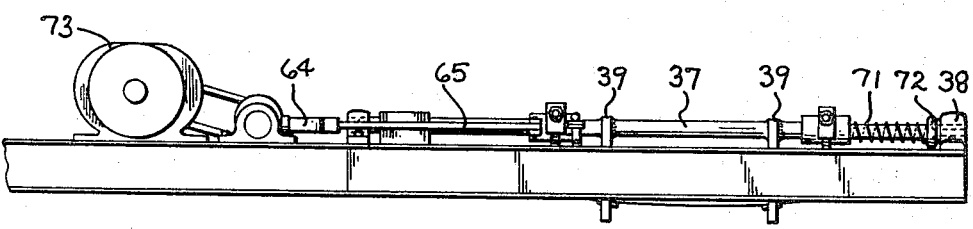
FIG. 6 is a side elevational view of the apparatus shown in FIG. 3.

Referring to FIGS. 1, 2 and 3, in accordance with the invention, the glass article is glazed immediately after the forming operation. Thus, the glass face plate F having a flat viewing portion 20 and an upstanding peripheral flange portion 21 is immediately removed from a mold 22 on the rotary table of a forming machine 23 wherein it has been pressed and is transferred to a burner assembly 25. At the burner assembly, the seam S (FIG. 9) formed at the match line between the base of the mold and the ring surrounding the mold is glazed and removed and the glass article is thereafter released onto a conveyor 26 which carries it to a successive operation such as annealing. The forming machine 23 may comprise a press which has a plurality of circumferentially spaced molds to which charges of molten glass are successively delivered and pressed by actuation of a plunger moving downwardly into each mold successively. Such a press is old and well known in the art.

As shown in FIG. 1, the apparatus for removing each hot glass article from a mold 22 comprises a suction head 27 which is supported by a shaft 28 that is movable upwardly and downwardly by a fluid cylinder 29. The cylinder 29 and shaft 28 are in turn mounted for horizontal movement in a track 30 by a fluid cylinder 31 which has its shaft 32 connected to the cylinder 29. Actuation of the cylinder 31 moves the suction head 27 horizontally between a position overlying a mold 22 and a position overlying burner assembly 25. Actuation of the cylinder 29 moves the suction head 27 upwardly and downwardly at the mold 22 and burner assembly 25.

As hereinafter described, the cylinders 29, 31 are operated to cause the suction head 27 to remove a face plate F from a mold 22, lift it from the mold, move it horizontally to a position overlying the burner assembly 25, thereafter move the face plate downwardly and release it onto the burner assembly 25. The suction head 27 then is returned to a successive mold 22 to remove and deliver a successive face plate to the burner assembly 25 while the first face plate is being glazed.

Referring to FIGS. 1–5, burner assembly 25 comprises a generally rectangular frame 35 on which a pair of parallel shafts 36, 37 are journalled by pillow blocks 38. Each shaft 36, 37 supports a pair of generally U-shaped arms 39 which are fixed thereto and have inwardly projecting portions 40 with pads 41 on the ends thereof. The shafts 36, 37 are interconnected, as presently described, and are oscillated periodically to move the arms 39 inwardly and outwardly toward and away from one another so that the portions 40 serve as removable supports for a face plate F. When the arms 39 are moved toward one another, they support a face plate in position for glazing, and when the arms are moved away from one another, they release the face plate to permit the face plate to fall onto an endless conveyor 26 which carries the face plate away from the burner assembly 25.

Specifically, the shafts 36, 37 are interconnected by a link 42 which extends between a drive lever 43 fixed on shaft 36 and drive lever 44 on a bracket 46 fixed on shaft 37. One end of a fluid cylinder 47 is pivoted at 48 to the frame 35 and the shaft of the cylinder 47 is pivoted to a lever 50 on bracket 46. When fluid is applied to the cylinder 47 to extend the piston shaft 49, the shafts 36, 37 are oscillated to swing the arms 39 away from one another. When the fluid is applied to retract the piston shaft 49, the shafts 36, 37 are oscillated to swing portions 40 of the arms 39 toward one another and create a support for a face plate delivered downwardly onto the arms by the suction head 27.

As shown in FIGS. 1–4 and 8, an elongated burner 55 is mounted adjacent each of the shafts 36, 37 for directing flames inwardly along the seam line S of the face plate F. As more specifically shown in FIGS. 4 and 8, each burner 55 is of conventional construction and is constructed to direct oxygen from pipe 55a through fine tubes 55b and fuel such as gas from pipe 55c to the face of the burner where the oxygen and gas mix and burn to direct a fine elongated line of flames against the seam line between the flange and base of the face plate F.

Each burner 55 is mounted on a U-shaped support 56 which, in turn, is vertically adjustably mounted by screws 57 extending through brackets 58 bolted to support 56 and nuts 57a, 57b threaded on screws 57. The upper end of the screws 57 are fixed in a second set of brackets 59 through which screws 60 extend generally horizontally from guide brackets 61 on the shafts 36, 37, respectively. Screws 60 and nuts 60a and 60b thereby control the horizontal position of the burners relative to brackets 61. The guided brackets 61 are interconnected by a connecting plate 62. The bolted joint between bracket 58 and holder 56 provides for angular adjustment of the burners. Burner holder 56 and bracket 58 are shaped such that angular adjustment of the burners 55 does not affect the vertical or horizontal setting. The center of rotation is about a point ½ inch away from the face of the burner ports.

As shown in FIG. 4, the end of each shaft 36, 37 which extends beyond the frame 35 is reduced as at 63 and a drive arm 64 is telescoped thereon for movement longitudinally. A rod 65 interconnects each drive arm 64 and the nearest bracket 61. A cam follower 66 is mounted on the end of each drive arm 64 and engages a cam 67 fixed on a cross shaft 68 journalled on an extension 69 of the frames 35 by pillow blocks 70 (FIGS. 3). A compression spring 71 extends between the other burner slide bracket 61 and a thrust bearing 72 on each shaft 36, to yieldingly urge the cam follower 66 against its respective cam 67. The shaft 68 is continuously rotated to continuously move each burner in a reciprocating manner with respect to the arms 39. This insures that irregularities in the flames of the burner, such as might occur due to manufacture or clogging of the portion of the burner, will not produce hot spots or non-uniform glazing. Specifically, a motor 73 is interconnected with the shaft 68 by pulleys 74, 75 and an endless belt 76 trained over the pulleys.

As shown in FIGS. 2–5, each burner has a stabilizing arm 77 fixed to one bracket 61 and extending into contact with a block 78 fixed on the frame 35. This holds the burner in proper angular relation with respect to the face plate F. In the event that it is desired to adjust the burner vertically, nuts 57a, 57b may be rotated. In the event that it is desired to move the burner horizontally toward or away from the face plate, nuts 60a, 60b can be adjusted. The burner assembly is readily adjustable for various sizes of glass ware through use of a plurality of mounting holes for the pillow blocks 38, and the cylinder mounting block 48. For various sizes of glass ware, various lengths of link 42 and block 78 are utilized.

Referring to FIGS. 1 and 7, the controls for cylinders 29 and 31, which move the suction head 27 vertically and horizontally, includes valves 80, 81, which form part of a circuit (not shown), the details of which do not form a part of the present invention. Cams 84, 85 that move with the suction head 27 operate the valves 80, 81 to produce the proper sequence of motions of the suction head.

As the suction head 27 is moved to the left, as shown in FIGS. 1 and 7, a pivoted cam lever 83 thereon operates a three-way valve 86 which, in turn, momentarily supplies a puff of air through valves P–1, P–2 to a four-way valve 87. The four-way valve 87 is of the double pilot operated, double detent type. Thus, as a hot newly formed face plate is brought toward the glazing apparatus by the suction head 27, actuation of valve 87 operates the cylinder 47 to swing the arms 39 outwardly and release the previously glazed face plate, permitting it to fall to the conveyor 26. Movement of the arms 39 outwardly causes a cam 88 on shaft 36 (FIG. 3) to operate a valve 89 (FIGS. 3, 7) causing a second puff of air to return the four-way valve 87 to its original position. This causes the cylinder 47 to operate and return the arms 39 to support position so that the suction head 27 can deliver the hot face plate to the arms. After the suction head releases the face plate, cylinder 31 returns the head to the forming apparatus. On the return stroke, the cam lever 83 pivots past the valve 86 and does not operate the valve.

Operation of valve P–1 or P–2 diverts line pressure directly to the pilot of the four-way valve 87, causing it to operate cylinder 47 and open the arms 39. This line pressure overrides any pressure from valve 89 that would tend to return the arms to their supporting position. While the arms are held in this extreme position, the burner holder 56 can be rotated away from the path of the hot glass a sufficient distance to permit changing the burner 55 without interruption of the forming operation.

In operation, the glass face plates, which are hot from the forming operation, are successively delivered to the arms 39 and each face plate is glazed while the suction head 27 returns to the forming apparatus to pick up another hot face plate. Since the glazing is accomplished while the face plate is hot and has substantial latent heat, a more efficient glazing operation is achieved. Distortion is prevented by glazing while the flange of the face plate extends upwardly. In the case of generally rectangular face plates shown, it has been found that glazing along the long axis is sufficient.

Thus in accordance with the invention, successive face plates are subjected to precisely the same glazing conditions. By glazing the face plates prior to delivery to the lehr for annealing, the results of glazing are readily visible thereby permitting adjustments to be made easily. All sides of the rectangular face plate can be glazed by adding burners along the short sides.

By reciprocating the burners along the seam line, any possibility of hot spots due to uneven temperature in the flames or clogging of any of the burner portions is eliminated. It is preferred that the cams 67 be oriented rotationally as shown in FIG. 4 such that the burners are reciprocated in opposite directions thereby distributing the load on the shaft 68 and motor more uniformly.

It can thus be seen that there has been provided a method and apparatus for glazing glass articles and particularly face plates efficiently and quickly with minimum interruption in production and without distorting any proportions thereof.

I claim:
1. In an apparatus for glazing glass articles, the combination comprising
support means, comprising article supporting members movable between supporting and non-supporting positions
said support means including means for moving the supporting members between supporting and non-supporting positions, article transfer means separate from the support means for removing hot glass articles from a forming machine and delivering said articles in succession to said support means, motion control means for controlling the movement of the article transfer means and the movement of the supporting members to move the supporting members to non-supporting positions after an article has been glazed and to return the supporting members to supporting positions before the transfer means transfers the next article thereto, burner means mounted to direct flames against portions of an article supported on the support members, and conveyor means positioned beneath said supporting means for receiving an article from said support means after said article has been released by said support means and for transferring the article away from the glazing apparatus.

2. The combination set forth in claim 1 including means interconnecting said article transfer means and said support means whereby said article transfer means transfers an article to said support means and said support means holds said article for glazing and releases said article while said article transfer means returns to said forming machine to remove and bring a successive hot glass article to said support means.

3. In an apparatus for glazing glass articles, the combination comprising
   a plurality of arms,
   means for mounting said arms for movement inwardly to provide a support for a hot glass article and outwardly to release a hot glass article,
   burners mounted adjacent said arms for directing flames against an article supported by said arms to glaze portions of the article,
   means for moving said arms periodically inwardly and outwardly to provide and remove a support for an article,
   means for removing an article from a forming machine and delivering it to said arms,
   and conveyor means positioned beneath said arms for receiving and removing an article released by said arms.

4. In an apparatus for glazing glass articles, the combination comprising
   a plurality of spaced-apart arms,
   means for mounting said arms for swinging movement toward and away from one another to provide a support for the glass article when the arms are swung toward one another and to release a glass article supported by said arms to fall to a further processing station when the arms are swung away from one another,
   means for simultaneously moving said arms toward and away from one another,
   burners mounted adjacent said arms for directing flames against portions of a glass article supported by said arms,
   means for removing a hot glass article from a forming machine and delivering article to a position on said arms, and
   motion control means for controlling movement of the swinging arms and the movement of the article removing and delivering means to swing the arms away from one another after an article has been glazed and to swing the arms toward one another before the article removing and delivering means delivers the next article to a position on the arms.

5. The combination set forth in claim 4 including means interconnecting said arm moving means and said means for removing and delivering a hot glass article whereby said arms support a hot glass article and release the hot glass article while said article removing and delivering means returns to said forming machine and removes a successive article and delivers it to said arm.

6. The combination set forth in claim 4 including conveyor means having a portion thereof beneath said arms for receiving a glass article released when said arms are swung away from one another.

7. An apparatus for glazing glass articles according to claim 1,
   wherein said glass articles are glass face plates having a generally flat viewing portion and a peripheral flange portion,
   and wherein said article transfer means transfers the face plates from a forming machine with the flange portion extending upwardly and delivers said face plates without inversion to said support means.

8. Apparatus for glazing glass articles according to claim 3,
   wherein said glass articles are glass face plates having a generally flat viewing portion and a peripheral flange portion,
   and wherein said article transfer means transfers the face plates from a forming machine with the flange portion extending upwardly and delivers said face plates without inversion to said support means.

9. Apparatus for glazing glass articles according to claim 8,
   wherein said means for removing an article from a forming machine and delivering it to said arms comprises a suction head attached to a vertically reciprocable rod of a fluid cylinder,
   said cylinder being reciprocable in a horizontal position between a molding and glazing station.

References Cited

UNITED STATES PATENTS

| 1,943,500 | 6/1934 | Winkler et al. | 214—6 |
| 2,567,033 | 9/1951 | Schutz | 65—260 X |
| 2,984,942 | 5/1961 | Wynne et al. | 65—120 |

S. LEON BASHORE, *Acting Primary Examiner.*

ARTHUR D. KELLOGG, *Assistant Examiner.*

U.S. Cl. X.R.

65—104, 120, 227, 260, 268, 284; 214—1, 6